United States Patent Office 3,600,399
Patented Aug. 17, 1971

3,600,399
CERTAIN 2-AMINO-5-IMIDAZOL-2-YL-1,3,4-THIADIAZOLES
Gerald Berkelhammer, Princeton, and William Henry Gastrock, Hightstown, N.J., William Alan Remers, Suffern, N.Y., and Andrew Stephen Tomcufcik, Old Tappan, and Martin Joseph Weiss, Oradell, N.J., assignors to American Cyanamid Company, Stamford, Conn.
No Drawing. Filed Oct. 11, 1968, Ser. No. 766,987
Int. Cl. C07d 91/62
U.S. Cl. 260—306.8                       5 Claims

ABSTRACT OF THE DISCLOSURE

The preparation of substituted imidazolyl-1,3,4-thiadiazoles by first preparing the imidazole moiety and then constructing the 1,3,4-thiadiazole moiety or by first preparing the 1,3,4-thiadiazole half and then adding the imidazole moiety, are described. A number of these compounds are useful as depressant agents for the treatment of mental disease and also as intermediates in the preparation of 2-amino-5-(1-methyl-5-nitro-2-imidazolyl)-1,3,4-thiadiazole. The latter compound has high antibacterial and antiprotozoal activity.

DESCRIPTION OF THE INVENTION

This invention relates to novel imidazolyl-1,3,4-thiadiazoles of the following formula, and intermediates for the preparation thereof:

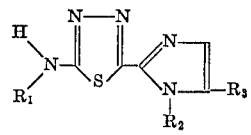

wherein $R_1$ is a member selected from the group consisting of hydrogen and alkanoyl, $R_2$ is a member selected from the group consisting of hydrogen, lower alkyl, hydroxyloweralkyl and loweralkanoyloxyloweralkyl and $R_3$ is a member selected from the group consisting of hydrogen and the nitro group with the proviso that at least one of $R_2$ and $R_3$ is hydrogen. The compounds of this invention are useful as depressant agents and also as intermediates for the preparation of compounds of Formula A

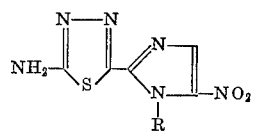

A wherein R is lower alkyl or hydroxyloweralkyl.

The compuonds of Formula A show very important oral, broad-spectrum antibacterial activity as well an antiprotozoal activity and as such, are useful in the treatment of bacterial infections, trichomoniasis, amebiasis and trypanosomiasis. The preparation of the present compounds and their conversion to compounds of Formula A ($R=CH_3$) is shown in the following flow chart.

FLOW CHART A

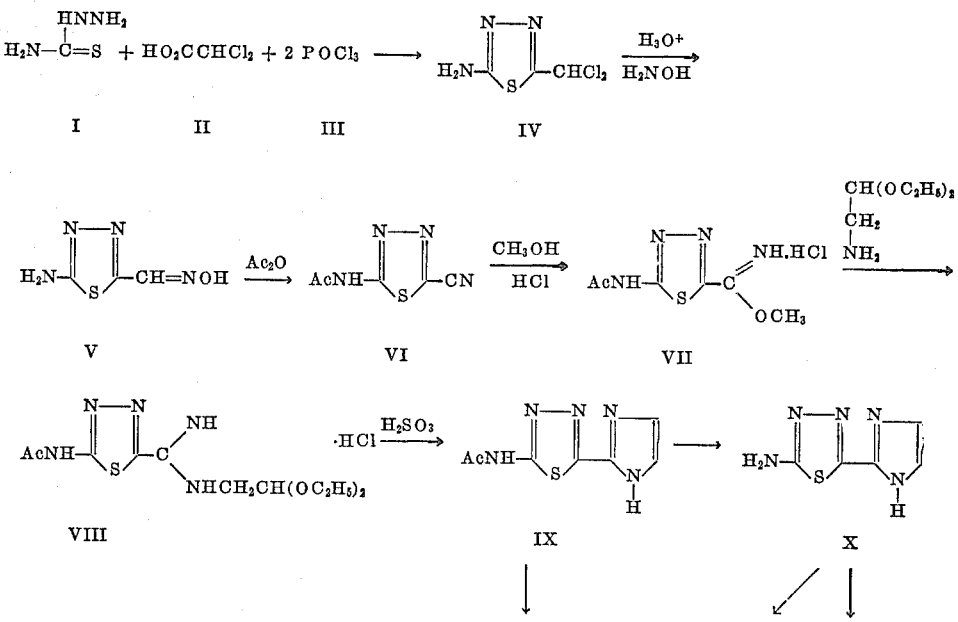

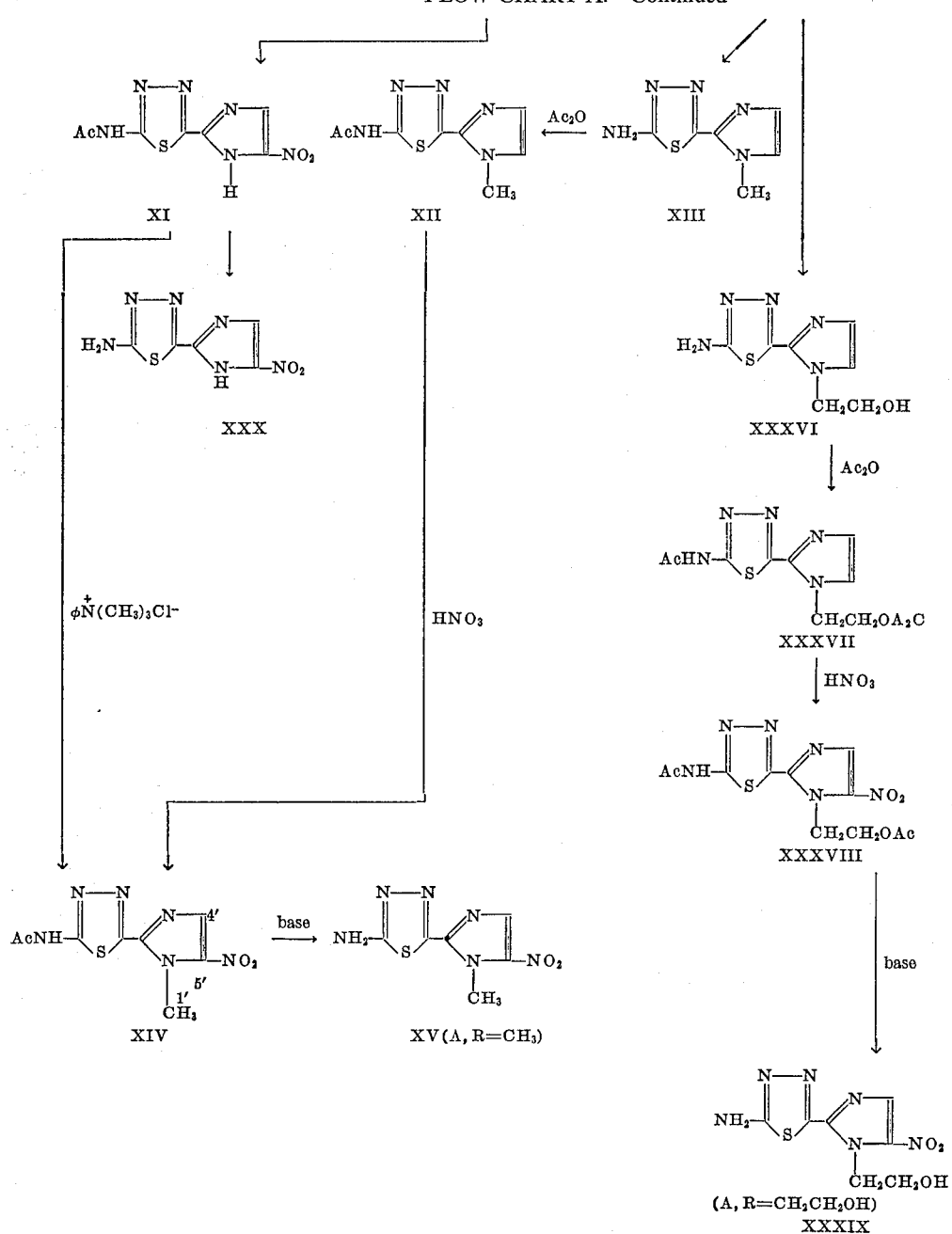
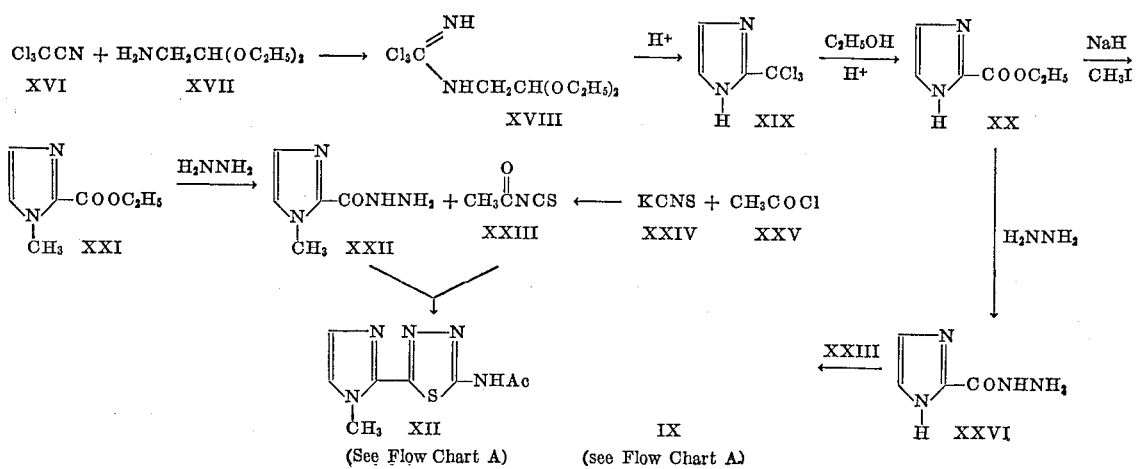

FLOW CHART C

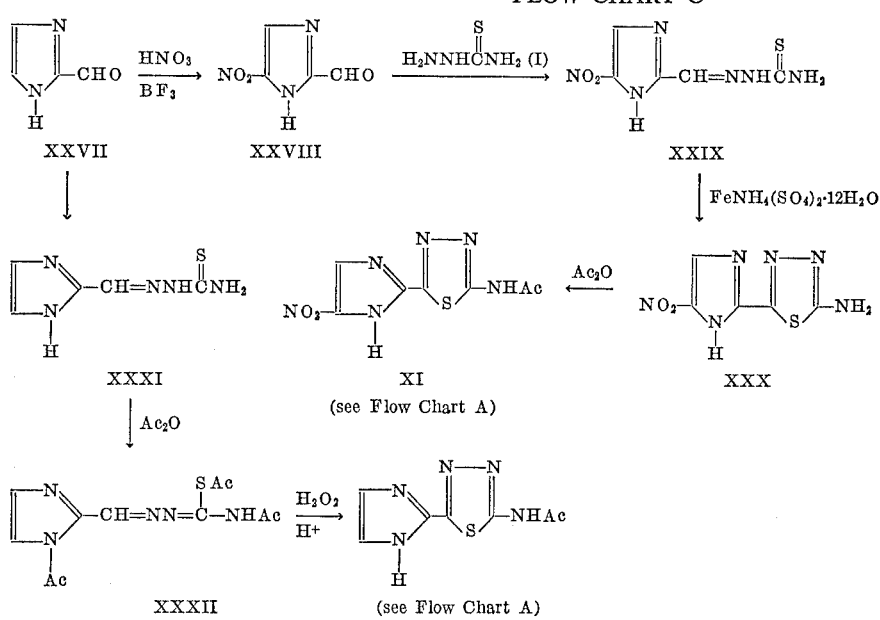

where Ac is loweralkanoyl.

FLOW CHART D

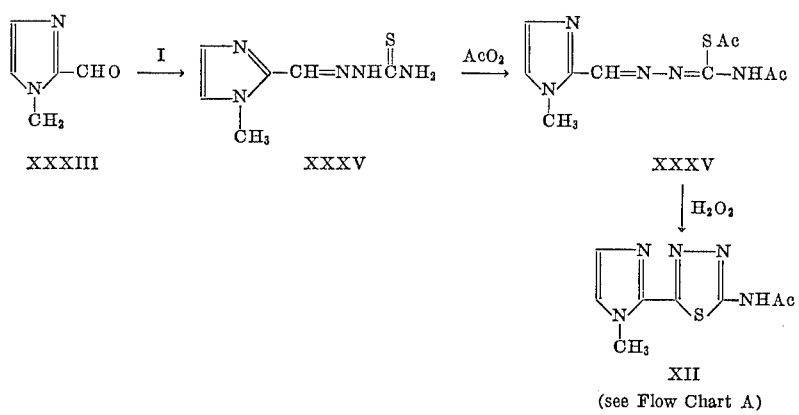

wherein Ac is loweralkanoyl.

In Flow Chart A the imidazolyl-1,3,4-thiadiazole system is prepared by first developing the 1,3,4-thiadiazole ring and then building onto it the imidiazole ring. In this approach the intermediate acetamido nitrile (VI) is a key compound. The synthesis of (VI) and its transformation to (VIII) is described in the application of co-workers W. A. Remers, G. J. Gibs and M. J. Weiss Ser. No. 766,986, filed Oct. 11, 1968.

Treatment of amidine (VIII) with strong acid results in closure to the imidazole ring to give (IX). For the conversion of compounds (IX) to (XV) and (XXXIX) (illustrative of Formula A) it is necessary to introduce a methyl group (or a β-hydroxyethyl group) and a nitro group in the appropriate positions. The preferred process involves de-N-acetylation of (IX) to give (X), methylation or hydroxyethylation of the imidazole nitrogen under alkaline conditions to give (XIII) or (XXXVI), reacetylation to (XII) or (XXXVII), nitration to (XIV) or (XXXVIII), and hydrolysis to (XV) or (XXXIX). That nitration of (XII) produces the 5′-nitro isomer (XIV) rather than the 4′-nitro isomer is an unobvious and surprising discovery of this invention since it is generally understood in the prior art that nitration of 1-alkylimidazoles gives predominately the 4′-nitro isomer. Thus, for example, K. Hoffman in "Imidazole and Its Derivatives" part I (Interscience Publishers, Inc., New York, N.Y., 1953), the definitive work on the imidazole field, states on pp. 127 and 128:

"It must be kept in mind, however, that nitration of a N-methylimidazole may lead to the formation of a 1,4- or a 1,5-isomer; both these possibilities are usually realized, with the 1,4-isomer predominanting. 1-methylimidazole is nitrated with the formation of a mixture composed mainly of 1-methyl-4-nitroimidazole and a smaller quantity of the 1,5-isomeride (5).

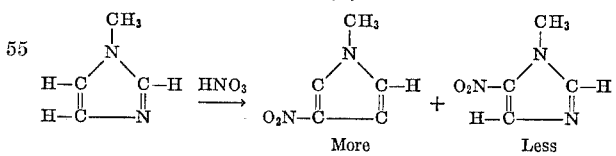

The nitration of 1,2-dimethylimidazole yields a large amount of 1,2-dimethyl-4-nitroimidazole and a smaller quantity of 1,2-dimethyl-5-nitroimidazole (7)."

An alternate pathway involves nitration of (IX) to (XI), followed by methylation to (XIV) and hydrolysis to (XV). Other alternate procedures leading to the preparation of (XV) via the novel compounds of this invention are illustrated in Flow Charts B, C and D.

The process of Chart B is based upon an initial synthesis of ethyl imidazole-2-carboxylate (XX) by a convenient and novel procedure involving condensation of trichloroacetonitrile (XVI) with aminoacetaldehyde acetal (XVII) via the intermediate amidine (XVIII) and the trichloromethylimidazole (XIX). The thiadiazole ring is then constructed via the hydrazides (XXII) or (XXVI), by reaction with acetylisothiocyanate (XXIII).

The procedure shown in Chart C starts with 2-imidazolecarboxaldehyde (XXVII). The key step is the nitration of this compound to 4(5)-nitro-2-imidazolecarboxaldehyde (XXVIII). This transformation is preferably carried out by nitration in the presence of boron trifluoride. By the usual procedures, well-known to the art, the nitroaldehyde (XXVIII) is then transformed to the nitroimidazolyl-amino-1,3,4-thiadiazole (XXX). The former substance, 4(5)-nitro-2-imidazolecarboxaldehyde, is a key feature of this sythesis; it is a novel compound and is to be considered as an integral part of this invention.

The special feature of the procedure shown in Chart D is that the N-methyl (alkyl) group is introduced at the very beginning of the sequence. This is a considerable advantage since the preparation of 1-methyl-2-imidazolecarboxaldehyde (XXXIII) is more convenient and therefore substantially more economical than that of the corresponding demethyl imidazole - 2 - carboxaldehyde (XXVII). That the 1-methyl group can be introduced at this early stage is a direct advantage flowing from our surprising discovery concerning isomer formation in the nitration of (XII), discussed above.

Although much of the above discussion and the flow charts are stated in terms of a methyl group substituted on an imidazole nitrogen and an acetyl group on the amino function, it should be understood that these considerations apply as well to other alkyl and alkanoyl groups than those illustrated.

The effectiveness of 2-amino - 5 - (1-methyl-5-nitro-2-imidazolyl) - 1,3,4 - thiadiazole and 2 - acetamido-5-(1-methyl - 5 - nitro - 2 - imidazolyl) - 1,3,4 - thiadiazole in controlling colibacillosis in poultry is demonstrated as follows:

Three groups of 10 five-day old sex-linked pullet chicks are infected parenterally, in the left thoracic air sac, with 0.2 ml. of a 10⁻¹ dilution of a Trypticase Soy Broth culture of *Escherichia coli,* the causative agent of colibacillosis in poultry. The compound 2 - amino - 5 - (1-methyl-5-nitro-2-imidazolyl)-1,3,4-thiadiazole (A, R=CH$_3$) is administered by gavage as a single oral dose in an aqueous solution or suspension, and the chicks are permitted to feed ad libitum on the feed composition. Twelve days after treatment, the test is terminated and the number of survivors in each group recorded. The results are compared with two control groups of 20 chicks each, in which one control group is infected and untreated, and the second control group is uninfected and untreated. The results of the test are set forth in the following table:

TABLE I

| Compound | Dose¹ | Total chicks tested | Survivors |
|---|---|---|---|
| 2-amino-5-(1-methyl-5-nitro-2-imidazolyl)-1,3,4-thiadiazole | 160 | 10 | 10 |
|  | 80 | 10 | 10 |
|  | 40 | 10 | 10 |
| Control: |  |  |  |
| Infected—Untreated | | 20 | 2 |
| Uninfected—Untreated | | 20 | 20 |

¹ Dose is in terms of milligrams per kilogram of body weight.

Four groups of 40, five-day old sex-linked pullet chicks are infected in the same manner as herein set forth with *Escherichia coli.* The compound 2 - acetamido-5-(1-methyl-5-nitro-2-imidazolyl) - 1,3,4 - thiadiazole is administered by gavage as a single oral dose in an aqueous medium, and the chicks are permitted to feed ad libitum on the feed composition. Twelve days after treatment, the test is terminated and the number of survivors in each group recorded. The results are compared with two control groups of 40 chicks each, in which one control group is infected and untreated, and the second control group is uninfected and untreated. The results of the test are set forth in the following table:

TABLE II

| Compound | Dose¹ | Total chicks tested | Survivors |
|---|---|---|---|
| 2-acetamido-5-(1-methyl-5-nitro-2-imidazolyl)-1,3,4-thiadiazole | 40 | 40 | 39 |
|  | 20 | 40 | 35 |
|  | 10 | 40 | 29 |
| Control: |  |  |  |
| Infected—Untreated | | 40 | 3 |
| Uninfected—Untreated | | 40 | 40 |

¹ Dose is in terms of milligrams per kilogram of body weight.

The following tests demonstrate the effectiveness of 2-amino - 5 - (1 - methyl - 5 - nitro - 2 - imidazolyl)-1,3,4-thiadiazole (A, R=CH$_3$) controlling enteritis.

Three groups of ten female Swiss Webster mice weighing 20 gm. were infected intraperitoneally with 0.5 ml. of 10⁻² dilution of a five-hour Trypticase Soy Broth culture of *Salmonella choleraesuis* var. *kunzendorf,* the causative agent of enteritis in pigs, an organism originally recovered from a field outbreak of *Salmonella choleraesius* var. *kunzendorf* in pigs. Each mouse received approximately 4.6×10⁷ cells as the inoculating dose.

The mice are fed a medicated feed, which is a commercial mouse chow containing the compound 2-amino-5 - (1 - methyl - 5 - nitro - 2 - imidazolyl) - 1,3,4-thiadiazole (A, R=CH$_3$) for 3 hours before infection until 7 days after infection. The mice are held for an additional 7 days after the medication is stopped, and the number of survivors in each group recorded. The medicated feed is prepared by thoroughly admixing calculated amounts of 2 - amino - 5 - (1 - methyl - 5 - nitro - 2 - imidazolyl) - 1,3,4 - thiadiazole (A, R=CH$_3$) with commercial mouse chow to provide essentially uniform distribution in the feed offered. The above results are compared with two control groups of ten mice each, in which one control group is infected and untreated, and the second control group is uninfected and untreated. The results of the test are set forth in the following table:

TABLE III

| Compound | Dose¹ | Total mice tested | Survivors |
|---|---|---|---|
| 2-amino-5-(1-methyl-5-nitro-2-imidazolyl)-1,3,4-thiadiazole | 0.1 | 10 | 10 |
|  | 0.025 | 10 | 9 |
|  | 0.006 | 10 | 1 |
| Control: |  |  |  |
| Infected—Untreated | | 10 | 2 |
| Uninfected—Untreated | | 10 | 10 |

¹ Dose is in terms of percentage by weight of the commercial mouse chow.

The following demonstrates employing two modes of administration, the efficacy of 2 - amino - 5 - (1 - methyl-5 - nitro - 2 - imidazolyl)-1,3,4-thiadiazole (A, R=CH$_3$) against *Trichomonas vaginalis* infections.

The first mode of administration, hereinafter designated Test A, employs six groups of mice, three groups of five and three groups of ten. The mice are inoculated with 50,000 culture-derived *Trichomonas vaginalis* (Thoms strain). The above compound is thoroughly mixed into ground feed and presented to the mice one day after inoculation. The average ad libitum drug intake, that is milligrams per kilogram of body weight per day, is estimated from the drug diet intake for 5 full days, and the mouse weights taken just before and just after treatment.

The second mode of administration, hereinafter designated Test B, employs six groups of mice, five groups of ten and one of five. The mice are inoculated with 50,000 culture-derived *Trichomonas vaginalis* (Thoms strain). The above compound is administered in a single oral dose by gavage one day after inoculation.

Six days of post inoculation scrapings, from the subcutaneous sites of inoculation, are searched microscopically for motile trichomonads, and antitrichomonal activity is concluded in those instances where motile trichomonads are eliminated from lesions present at the site of inoculation.

Mouse body weight gain from day 1 to day 6 post-inoculation shows that 2 - amino - 5 - (1 - methyl-5-nitro-2-imidazolyl)-1,3,4-thiaidazole is well tolerated by the animals ingesting same. Furthermore, experimentation demonstrates that more than 1,000 mg. per kilogram of body weight of said compound is well tolerated.

The results of the test are set forth in the following tables:

TABLE IV.—TEST A

| Compound | Dose[1] | Total mice tested | Cleared | Percentage cleared |
|---|---|---|---|---|
| 2-amino-5-(1-methyl-5-nitro-2-imidazolyl)-1,3,4-thiadiazole | 170 | 5 | 5 | 100 |
| | 95 | 5 | 5 | 100 |
| | 90 | 10 | 10 | 100 |
| | 65 | 5 | 4 | 80 |
| | 44 | 10 | 3 | 30 |
| | 10 | 10 | 0 | 0 |

[1] Dose is in terms of milligrams per kilogram of body weight per day

TABLE V.—TEST B

| Compound | Dose[1] | Total mice tested | Cleared | Percentage cleared |
|---|---|---|---|---|
| 2-amino-5-(1-methyl-5-nitro-2-imidazolyl)-1,3,4-thiadiazole | 100 | 5 | 5 | 100 |
| | 50 | 10 | 10 | 100 |
| | 50 | 10 | 10 | 100 |
| | 25 | 10 | 9 | 90 |
| | 12 | 10 | 7 | 70 |
| | 6 | 10 | 2 | 20 |

[1] Dose is in terms of milligrams per killogram of body weight.

The following demonstrates the effectiveness against fowl typhoid of 2-amino-5-(1-methyl-5-nitro-2-imidazolyl)-1,3,4-thiadiazole, 2-acetamido-5-(1-methyl-5-nitro-2-imidazolyl)-1,3,4-thiadiazole, 2-amino-5-[1-(2-hydroxyethyl)-5-nitro-2-imidazolyl]-1,3,4-thiadiazole, and 2-acetamido-5-[1-(2-acetoxyethyl)-5-nitro-2-imidazolyl]-1,3,4-thiadiazole.

Groups of five, then, twenty or forty one-day old sex-linked pullet chicks are infected orally by gavage with 0.5 ml. of *Salmonella gallinarum*, the causative agent of fowl typhoid. Each chick received approximately $6 \times 10^5$ viable cells.

Medication is administered continuously in the feed, beginning 3 hours before infection and continuing for 10 days, at which time the test is terminated and the number of survivors in each group recorded. The results are compared with two control groups of chicks, the first group comprising 20 chicks which are infected and untreated, and the second group comprising 10 chicks which are uninfected and untreated. The results of the test are set forth in the following table:

TABLE VI

| Compound | Dose[1] | Total chicks tested | Survivors |
|---|---|---|---|
| 2-amino-5-(1-methyl-5-nitro-2-imidazolyl)-1,3,4-thiadiazole | 0.1 | 10 | 9 |
| | 0.05 | 5 | 5 |
| | 0.025 | 5 | 5 |
| | 0.006 | 5 | 1 |
| 2-acetamido-5-(1-methyl-5-nitro-2-imidazolyl)-1,3,4-thiadiazole | 0.1 | 5 | 5 |
| | 0.025 | 5 | 4 |
| | 0.006 | 5 | 3 |
| 2-amino-5-[1-(2-hydroxyethyl)-5-nitro-2-imidazolyl]-1,3,4-thiadiazole | 0.1 | 40 | 35 |
| | 0.05 | 40 | 28 |
| | 0.025 | 40 | 9 |
| 2-acetamido-5-[1-(2-acetoxyethyl)-5-nitro-2-imidazolyl]-1,3,4-thiadiazole | 0.1 | 5 | 3 |
| Control: | | | |
| Infected—Untreated | | 20 | 0 |
| Uninfected—Untreated | | 10 | 10 |

[1] Dose is in terms of percentage by weight of the feed composition described above.

DETAILED DESCRIPTION

The following examples describe in detail the preparation of representative compounds of the present invention as well as intermediates leading up to the present compounds and methods of converting the present compounds to physiologically active imidazolyl-1,3,4-thiadiazoles.

EXAMPLE 1

Preparation of 2-amino-5-dichloromethyl-1,3,4-thiadiazole (IV) and 2 - amino-1,3,4-thiadiazole-2-carboxaldehyde oxime (V)

To an ice-cooled mixture of 9.11 g. (0.1 mole) of thiosemicarbazide and 12.89 g. (0.1 mole) of dichloroacetic acid is added slowly, with vigorous stirring, 30.67 g. (18 ml., 0.2 mole) of phosphorus oxychloride. After this addition is complete the ice bath is replaced by a water bath and the temperature is raised gradually to 70° C. Vigorous evolution of hydrogen chloride ensues as the temperature nears 70° C. and the mixture is briefly cooled to control foaming. After about 70 min., gas evolution ceases. The resulting viscous solution is stirred at 70° C. for an additional hour and then is cooled in an ice bath. To the thus-formed 2-amino-5-dichloromethyl-1,3, 4-thiadiazole, a solution of 30 g. of hydroxylamine hydrochloride in 50 ml. of water is added followed by 20 ml. of concentrated hydrochloric acid immediately afterward. The mixture is stirred at 70° C. for 5 hours, cooled and filtered to remove some excess hydroxylamine hydrochloride. When the pH of the filtrate is adjusted to 6.0 by addition of 5 N sodium hydroxide, 5-amino-1,3,4-thiadiazole - 2 - carboxaldehyde oxime crystallizes as brownish prisms. It is washed with cold water and dried under reduced pressure. A 10.8 g. yield of material suitable for direct conversion to the nitrile is obtained (if desired, the oxime may be recrystallized from ethanol or from methanol-water).

EXAMPLE 2

Preparation of 2-acetamido-1,3,4-thiadiazole-5-carbonitrile (VI)

A mixture of 10.8 g. of the crude oxime (Example 1) and 100 ml. of acetic anhydride is heated at reflux temperature for 18 hours and then is concentrated under reduced pressure. The tan solid residue (13 g.) is dissolved in 50 ml. of hot methanol, diluted with 50 ml. of water and cooled. Yellow crystals of the nitrile are obtained. The yield of product melting at 226–230° C. is 8.5 g.

EXAMPLE 3

Preparation of 5-acetamido-1,3,4-thiadiazole-2-carboximidic acid methyl ester hydrochloride (VII)

A mixture of 8.40 g. (50 mmoles) of 5-acetamido-1,3, 4-thiadiazole-2-carbonitrile (Example 2) and 80 ml. of tetrahydrofuran is treated with 4.05 ml. (3.20 g., 100 mmoles) of methanol, chilled in an ice bath and saturated with anhydrous hydrogen chloride. Solid forms during this saturation process. The mixture is kept at 5° C. for 22 hours and then is filtered. The solid imino ether hydrochloride is washed well with ether and can be used at this stage (melting point 202–208° C.; $\lambda_{max}$ 2.9, 3.1, 3.4, 5.9$\mu$) directly in the next step (Example 4).

EXAMPLE 4

Preparation of 5-acetamido-N-(2,2-diethoxyethyl)-1,3,4-thiadiazole-2-carboxamidine hydrochloride (VIII)

The imino ether hydrochloride from Example 3 is added to an ice-cooled mixture of 5.25 g. (50 mmoles) of aminoacetaldehyde diethylacetal and 100 ml. of methanol. The resulting mixture is heated at reflux temperature for 19 hours and is then concentrated under reduced pressure. The gummy residue is triturated with ether, containing a little methanol, until the amidine hydrochloride crystallizes. The product is washed with ether and air dried. It has $\lambda_{max}$ 2.9, 3.4 (broad), 5.9$\mu$; 278 m$\mu$.

EXAMPLE 5

Preparation of 2-acetamido-5-(2-imidazolyl)-1,3,4-thiadiazole (IX)

The amidine of Example 4 is added in portions to 20 ml. of concentrated sulfuric acid. The mixture, which foams and becomes warm, is cooled in a water bath when necessary. When complete solution is obtained, it is poured onto 100 g. of ice and the resulting solution (filtered if necessary) is brought to pH 6 with 5 N sodium hydroxide (ice cooling). The precipitate that forms is washed with water and dried in air. This procedure gives 5.75 g. of yellow solid product that does not melt below 320° C.

EXAMPLE 6

Preparation of 2-amino-5-(2-imidazolyl)-1,3,4-thiadiazole (X)

A suspension of 4.18 g. (20 mmoles) of 2-acetamido-5-(2-imidazolyl)-1,3,4-thiadiazole (Example 5) in 50 ml. of concentrated hydrochloric acid is heated at reflux temperature until a clear solution results (40 min.). It is then concentrated under reduced pressure and the residue is dissolved in 10 ml. of water and neutralized to pH 5 with sodium hydroxide. The white solid that forms is washed with water and air dried. A 2.20 g. yield of product that decomposes, but does not melt about 285° C., is obtained.

EXAMPLE 7

Preparation of 2-amino-5-(1-methyl-2-imidazolyl)-1,3,4-thiadiazole (XIII)

A mixture of 307 mg. (1.85 mmoles) of 2-amino-5-(2-imidazolyl)-1,3,4-thiadiazole (Example 6) and 3.8 ml. of 0.5 N sodium hydroxide is stirred and filtered to remove some insoluble material. The filtrate is treated with 0.17 ml. (1.85 mmoles) of dimethyl sulfate and is stirred for 45 min. The solid that separates is washed with water and dried in air. This procedure gives 124 mg. of nearly white crystalline product, melting point 258–260° C.

EXAMPLE 8

Preparation of 2-amino-5-[1-(2-hydroxyethyl)-2-imidazolyl]-1,3,4-thiadiazole (XXXVI)

A solution of 3.34 g. (20 mmoles) of 2-amino-5-(2-imidazolyl) - 1,3,4-thiadiazole (Example 6), 1.08 g. (2 mmoles) of sodium methoxide, and 1.51 g. (20 mmoles) of β-chloroethanol in 25 ml. of dimethylformamide is heated under reflux for three hours. The reaction mixture is cooled, the solvent removed under reduced pressure and the residue treated with water to give the product as a white solid.

EXAMPLE 9

Preparation of 2-acetamido-5-(1-methyl-2-imidazolyl)-1,3,4-thiadiazole (XII) and 2-acetamido-5-(1-methyl-5-nitro-2-imidazolyl)-1,3,4-thiadiazole (XIV)

A mixture of 124 mg. (0.7 mmole) of 2-amino-5-(1-methyl - 2 - imidazolyl) - 1,3,4 - thiadiazole (Example 7) and 0.4 ml. of acetic anhydride is heated on a steam bath for 5 minutes to give 2-acetamido-5-(1-methyl-2-imidazolyl)-1,3,4-thiadiazole. To the resulting mixture is added 1.2 ml. of acetic acid, 0.05 ml. of 70% nitric acid, and an additional 0.2 ml. of acetic anhydride. The mixture is heated on a steam bath and is treated with 0.02 ml. of 70% nitric acid. A vigorous reaction ensues and brown gas is evolved. In about 10 minutes a clear solution is obtained. It is concentrated and the residue is treated with water. The yellow solid that forms is washed with water and is dried in air. This procedure gives 61 mg. of 2 - acetamido-5-(1-methyl-5-nitro-2-imidazolyl)-1,3,4-thiadiazole.

EXAMPLE 10

Preparation of 2 - acetamido - 5 - [1-(2-acetoxyethyl)-2-imidazolyl - 1,3,4 - thiadiazole (XXXVII) and 2-acetamido - 5 - [1 - (2 - acetoxyethyl)-5-nitro-2-imidazolyl]-1,3,4-thiadiazole (XXXVIII)

A mixture of 206 mg. (1 mmole) of 2-amino-5-[1-(2-hydroxyethyl) - 2 - imidazolyl]-1,3,4-thiadiazole (Example 8) and 0.7 ml. of acetic anhydride is heated on a steam bath for 10 minutes, giving 2-acetamido-5-[1-(2-acetoxyethyl)-2-imidazolyl-1,3,4-thiadiazole. Acetic acid (2 ml.), 70% nitric acid (0.1 ml.), and acetic anhydride (0.3 ml.) are added and the mixture is heated on a steam bath. After 10 minutes, the solution is concentrated under reduced pressure and the residue treated with water. The resultant solid 2-acetamido-5-[1-(2-acetoxyethyl)-5-nitro-2-imidazolyl]-1,3,4-thiadiazole is removed by filtration and air dried.

EXAMPLE 11

Preparation of 2-amino-5-(1-methyl-5-nitro-2-imidazolyl)-1,3,4-thiadiazole (XV) (A, R=CH$_3$)

A mixture of 60 mg. of crude 2-acetamido-5-(1-methyl - 5 - nitro - 2 - imidazolyl) - 1,3,4-thiadiazole (Example 9) and 0.2 ml. of concentrated hydrochloric acid is heated on a steam bath for 15 minutes, cooled, and concentrated under reduced pressure. The residue is treated with 1 N sodium hydroxide until the pH 7 is obtained, whereupon solid separates. This solid is washed with water and dried in air, yield 23 mg. Partition chromatography on diatomaceous earth with a heptane-ethyl acetate-methanol-water (70:30:15:6) system affords several fractions absorbing at 357 m$\mu$. The largest of these fractions, upon concentration, gives yellow crystals which are identical in infrared spectrum and behavior on thin-layer chromatography with authentic sample of 2-amino - 5 - (1 - methyl - 5 - nitro - 2 - imidazolyl)-1,3,4-thiadiazole.

EXAMPLE 12

Preparation of 2 - amino - 5 - [1 - (2 - hydroxyethyl)-5 - nitro - 2 - imidazolyl] - 1,3,4-thiadiazole (XXXIX) (A, R=CH$_2$CH$_2$OH)

A mixture of 67 mg. (0.2 mmole) of 2-acetamido-5-[1 - (2 - acetoxyethyl)-5-nitro-2-imidazolyl]-1,3,4-thiadiazole (Example 10) and 0.3 ml. of concentrated hydrochloric acid is heated on a steam bath for 15 minutes. The cooled reaction mixture is concentrated under reduced pressure and the residue treated with concentrated sodium carbonate solution, resulting in the separation of the solid title compound, which is filtered off and air dried.

EXAMPLE 13

Preparation of ethyl imidazole-2-carboxylate (XX)

Trichloroacetonitrile (72 g., 0.5 mole) and aminoacetaldehyde diethyl acetal (70 g., 0.58 mole) in 500 ml. of benzene is allowed to stand at room temperature for two days. This solution is treated in the cold with 100 ml. of 12 N sulfuric acid and is then stirred overnight under a current of air (to effect benzene removal). The solution is poured into 3 liters of ethanol, and this solution is concentrated to 500 ml. volume and heated at reflux temperature for 18 hours. The cooled solution is neutralized with 27% ammonium hydroxide and then is evaporated under reduced pressure. The residue is slurried with 500 ml. of cold water; filtration gives 31.0 g. (44%) of crude ester that is recrystallized from 620 ml. of water with the acid of activated charcoal to give 23.0 g. (33%) of pure ester.

EXAMPLE 14

Preparation of 1-methylimidazole-2-carbohydrazide (XXII)

A solution of 18.0 g. (0.128 mole) of pure ethyl imidazole-2-carboxylate (Example 13) in 150 ml. of dry dimethylformamide is treated with 6.8 g. (0.15 mole) of 54.7% sodium hydride in mineral oil suspension. After gas evolution ceases, 20 g. (0.14 mole) of methyl iodide is added and the reaction is stirred at room temperature overnight. Ethanol (10 ml.) is added, followed by 10 ml. of glacial acetic acid. This solution is evaporated to dryness under reduced pressure, and the residue is slurried in 50 ml. of water. This mixture is extracted with two 250 ml. portions of chloroform, and the combined extracts are evaporated under reduced pressure. The oil is dissolved in 100 ml. of ethanol, 10 ml. (10.3 g., 0.21 mole) of 98–100% hydrazine hydrate is added, and the solution is heated at reflux temperature for 90 minutes. The solution is evaporated to give 15 g. (83%) of crude hydrazide as an oil that crystallizes on standing.

EXAMPLE 15

Preparation of 2-acetamido-5-(1-methyl-2-imidazolyl)-1,3,4-thiadiazole (XII)

Acetyl chloride (11 ml., 12 g., 0.15 mole) is added to a slurry of 20 g. (0.206 mole) of finely ground dry potassium thiocyanate in 500 ml. of dry tetrahydrofuran. The mixture is heated at reflux for 6 hours, cooled to room temperature and is filtered to remove the inorganic salts. The 15 g. (0.107 mole) of crude hydrazide prepared in Example 14 is dissolved in 200 ml. of tetrahydrofuran, mixed with the above solution of acetyl isothiocyanate and stirred overnight. Acetic anhydride (200 ml.) is added, and the reaction is heated on the steambath under an air condenser to expel the tetrahydrofuran. The hot suspension is filtered, and the residue is washed with ether and dried to give 13 g. (55%) of product.

EXAMPLE 16

Preparation of 4(5)-nitro-2-imidazolecarboxaldehyde (XXVIII)

To a mixture of 90% nitric acid (71.7 g.) and boron trifluoride (69.9 g.) stirred at 5–10° C. is added 2-imidazolecarboxaldehyde (20 g.) [P. Iverson and H. Lund, Acta. Chem. Scand., 20, 2649 (1966)], in portions. The resulting dark solution is stirred at room temperature for 5 days. The reaction mixture is poured over ice and the insolubles are removed by filtration. The filtrate is brought to pH 5 with 6 N sodium hydroxide and is extracted with seven 100 ml. portions of ethyl acetate. The combined extracts are washed with water and saturated sodium chloride solution and dried over magnesium sulfate. Evaporation to dryness affords 8.7 g. (30%) of product.

EXAMPLE 17

Preparation of 5-nitro-2-imidazolecarboxaldehyde thiosemicarbazone (XXIX)

The crude aldehyde (8.7 g.) from Example 16 is dissolved in 200 ml. of hot water and the solution is filtered. To the hot filtrate is added 20 drops of concentrated hydrochloric acid and thiosemicarbazide (8.7 g.). The resulting mixture is heated on a steam bath for 15 minutes and kept at room temperature overnight. The mixture is cooled and the solid is filtered, washed with water, and dried, affording 9.7 g. (73%) of thiosemicarbazone, unmelted at 330° C.

EXAMPLE 18

Preparation of 2-amino-5-[4(5)-nitro-2-imidazolyl]-1,3,4-thiadiazole (XXX)

Ferric ammonium sulfate dodecahydrate (8.7 g.) is dissolved in 250 ml. of water and the solution is filtered to remove insolubles. To this solution is added 9.7 g. of 4(5)-nitro-2-imidazolecarboxaldehyde thiosemicarbazone (Example 17) and the mixture is stirred and heated at 85° C. for 45 minutes. The mixture is cooled and the solid is filtered. The solid is dissolved in hot dimethylformamide and the solution is filtered and poured into water. The resulting solid is filtered, affording 6.5 g. of brown product. The solid is dissolved in aqueous sodium hydroxide filtered and acidified. The yellow-brown solid is filtered, washed with water and dried affording 6.2 g. (65%) of 2 - amino-5-[4(5)-nitro-2-imidazolyl]-1,3,4-thiadiazole, unmelted at 330° C.

EXAMPLE 19

Preparation of 1-methyl-2-imidazolecarboxaldehyde thiosemicarbazone (XXXIV)

A mixture of 11 g. of 1-methyl-2-imidazolecarboxaldehyde [P. Iverson and H. Lund, Acta Chem. Scand., 20, 2649 (1966)], 9.1 g. of thiosemicarbazide, and a drop of concentrated hydrochloric acid in 200 ml. of 95% ethanol is heated to reflux temperature for 30 minutes. It is then filtered and the filtrate cooled to give crystals of the title compound, which is collected by filtration and washed with cold 95% ethanol. The yield is 10.5 g. and the product melts at 211.5–214° C.

EXAMPLE 20

Preparation of 1-methyl-2-imidazolecarboxaldehyde N,S-diacetylthiosemicarbazone (XXXV)

A slurry of 0.3 g. of 1-methyl-2-imidazolecarboxaldehyde thiosemicarbazone (Example 19) in 10 ml. of acetic anhydride is stirred and heated at 105–110° C. for one hour. The mixture is cooled and the solid is filtered, washed with acetic anhydride and dried, affording 0.4 g. of 1-methyl - 2 - imidazolecarboxaldehyde N,S-diacetyl-thiosemicarbazone, melting point 270–273° C., dec.

EXAMPLE 21

Preparation of 2-acetamido-5-(1-methyl-2-imidazolyl)-1,3,4-thiadiazole (XII)

To a mixture of 0.17 g. of 30% hydrogen peroxide and 5 ml. of acetic acid is added 0.4 g. of 1-methyl-2-imidazole-carboxaldehyde N,S-diacetylthiosemicarbazone (Example 20) and the mixture is stirred and heated at 70–80° C. for 30 min. The reaction mixture is diluted with 20 ml. of water and the solid is filtered and dried, affording 0.12 g. (33%) of 2-acetamido-5-(1-methyl-2-imidazolyl)-1,3,4-thiadiazole, unmelted at 325° C.

EXAMPLE 22

Preparation of 2-imidazolecarboxaldehyde thiosemicarbazone (XXX)

A mixture of 0.12 g. of crude 2-imidazolecarboxaldehyde and 0.1 g. of thiosemicarbazide in 5 ml. of water containing a trace of 6 N aqueous hydrochloric acid is heated on a steam bath for 15 minutes, cooled, and the white crystals of the title compound collected. The product melts at 221–223° C. with decomposition. A sample is recrystallized from ethyl acetate and melts at 218–220° C. (dec).

EXAMPLE 23

Preparation of triacetyl 2-imidazolecarboxaldehyde thiosemicarbazone (XXXII)

A slurry of 0.5 g. of 2-imidazolecarboxaldehyde thiosemicarbazone (Example 22) in 10 ml. of acetic anhydride is heated at reflux for one hour. The mixture is cooled and the solid is filtered, washed with acetic anhydride, and dried, affording 0.6 g. (69%) of triacetyl 2-imidazolecarboxaldehyde thiosemicarbazone, melting point 266–268° C., dec.

EXAMPLE 24

Preparation of 2-acetamido-5-(2-imidazolyl)-1,3,4-thiadiazole (IX)

To a solution of 0.92 g. of 30% hydrogen peroxide in 20 ml. of glacial acetic acid is added 1.0 g. of triacetyl 2 - imidazolecarboxaldehyde thiosemicarbazone (Example 23), and the mixture is heated at 70–75° C. for 1 hour. Water is added and the solid is filtered. The solid is slurried with water and made slightly alkaline with 10% sodium bicarbonate solution. The solid is filtered, washed with water, and dried, affording 149 mg. of 2-acetamido-5-(2-imidazolyl)-1,3,4-thiadiazole.

EXAMPLE 25

Preparation of 2-acetamido-5-[4(5)-nitro-2-imidazolyl] 1,3,4-thiadiazole (XI)

A suspension of 418 mg. (2 mmoles) of 2-acetamido-5-(2-imidazolyl)-1,3,4-thiadiazole (Example 5) in 1 ml. of acetic anhydride and 3 ml. of acetic acid is treated with 0.12 ml. (2 mmoles) of 70% nitric acid and the mixture is heated on a steam bath for 30 minutes. It is then treated with an additional 0.04 ml. of nitric acid and heated for 10 minutes. It is filtered and the filtrate is concentrated. The solid residue is triturated with water, washed well with more water, and dried in air. This procedure gives 227 mg. (44%) of yellow solid which did not melt below 320° C.

EXAMPLE 26

Preparation of 2-amino-5-[4(5)-nitro-2-imidazolyl]-1,3,4-thiadiazole (XXX)

A solution of 2-acetamide-5-[4(5)-nitro-2-imidazoyl] 1,3,4-thiadiazole (Example 25) in concentrated hydrochloric acid is heated on a steam bath for 30 minutes, cooled, and neutralized with 5 N sodium hydroxide solution. The yellow solid that separates is washed with water and dried under vacuum.

EXAMPLE 27

Preparation of 2-acetamido-5-[4(5)-nitro-2-imidazolyl] 1,3,4-thiadiazole (XI)

A mixture of 0.5 g. of 2 - amino - 5-[4(5)-nitro-2-imidazolyl]-1,3,4-thiadiazole (Example 18) and 10 ml. of acetic anhydride is heated at reflux for 1 hour. The reaction mixture is evaporated to dryness and the residue is slurried with 25 ml. of ether and filtered affording 0.6 g. of 2 - acetamido - 5[4(5)-nitro-2-imidazolyl] - 1,3,4-thiadiazole, unmelted at 330° C.

EXAMPLE 28

Preparation of 2-acetamido-5-(1-methyl-5-nitro-2-imidazolyl)-1,3,4-thiadiazole (XIV)

To 0.005 g. of 2-acetamide-5-[4(5)-nitro-2-imidazolyl] 1,3,4-thiadiazole (Example 27) in 5 ml. of anhydrous dimethylformamide is added 0.05 g. of phenyltrimethylammonium chloride and the resulting mixture is stirred and heated at 110–115° C. for 2 hours. The reaction mixture is evaporated to dryness and the residue is washed with water, affording 2-acetamido-5-(1-methyl-5-nitro-2-imidazolyl)-1,3,4-thiadiazole.

We claim:

1. An imidazolyl-1,3,4-thiadiazole of the formula:

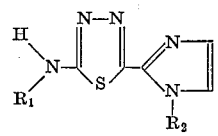

wherein $R_1$ is selected from the group consisting of hydrogen and lower alkanoyl, $R_2$ is selected from the group consisting of hydrogen, loweralkyl, hydroxyloweralkyl and loweralkanoyloxyloweralkyl.

2. An imidazolyl-1,3,4-thiadiazole according to claim 1: 2- loweralkanoylamido - 5 - (2-imidazolyl) - 1,3,4-thiadiazole.

3. An imidazolyl-1,3,4 - thiadiazole according to claim 1: 2 - amino-5 - (1-loweralkyl - 2 - imidazolyl)-1,3,4-thiadiazole.

4. The compound, 2 - amino-5-(2-imidazolyl) - 1,3,4-thiadiazole.

5. The compound, 2-acetamido-5-(1-methyl-2-imidazolyl)-1,3,4-thiadiazole.

References Cited

UNITED STATES PATENTS 3,452,035   6/1969   Berkelhammer et al. 260—306.8

ALEX MAZEL, Primary Examiner

R. J. GALLAGHER, Assistant Examiner

U.S. Cl. X.R.

260—309; 424—271